United States Patent [19]

Onishi et al.

[11] Patent Number: 4,823,902

[45] Date of Patent: Apr. 25, 1989

[54] CONSTANT-SPEED CRUISING APPARATUS

[75] Inventors: Masayoshi Onishi; Takeshi Yasukawa, both of Himeji, Japan

[73] Assignee: Mitsubishi Denki Kabushiki Kaisha, Tokyo, Japan

[21] Appl. No.: 110,285

[22] Filed: Oct. 20, 1987

[30] Foreign Application Priority Data

Oct. 22, 1986 [JP] Japan ............................. 61-252319
Dec. 16, 1986 [JP] Japan ............................. 61-300359
Dec. 16, 1986 [JP] Japan ............................. 61-300360

[51] Int. Cl.⁴ ................................................ B60K 31/00
[52] U.S. Cl. .................................... 180/170; 180/177;
180/179; 123/361; 74/520
[58] Field of Search ............... 180/170, 177, 178, 179;
123/360, 361, 396, 399; 74/478, 585, 520

[56] References Cited

U.S. PATENT DOCUMENTS 2,204,492  6/1940  Heintz ................................ 123/361
3,065,812  11/1962 Malecki ............................... 123/361
4,132,284  1/1979  Tomecek ............................. 180/179

FOREIGN PATENT DOCUMENTS 944908  6/1956  Fed. Rep. of Germany ...... 123/396
320500  3/1957  Switzerland ........................ 123/396

Primary Examiner—David M. Mitchell
Assistant Examiner—Brian L. Johnson
Attorney, Agent, or Firm—Oblon, Fisher, Spivak, McClelland & Maier

[57] ABSTRACT

For constant-speed cruising of a car, a throttle valve in a carburetor of a car is controlled by a motor-driven actuator through an improved variable-length lever mechanism. The variable-length lever mechanism has four arms which are movably connected through four elbows to form a changeable rhombic shaped lever. A linear actuator is interposed between a first pair of the four elbows at first opposing corners so that the distance between the first pair of elbows is expanded or contracted, whereby a radius in swing movement of the variable rhombic shaped lever mechanism is changed.

5 Claims, 5 Drawing Sheets

CONSTANT-SPEED CRUISING APPARATUS

FIELD OF THE INVENTION

The present invention relates to a constant-speed cruising apparatus capable of controlling opening and closing operations by a throttle valve in the carburetor of a car by a motor-driven actuator through an improved lever machanism within a range of the turning movement of the lever mechanism.

BACKGROUND OF THE INVENTION

There has been proposed a constant-speed control apparatus for a car which adjusts the degree of opening of a throttle valve by a driving stroke of a motor-driven actuator to run the car at a predetermined car speed.

FIG. 9 is a diagram showing a conventional constant-speed cruising apparatus. In FIG. 9, a motor-driven type actuator 20 is driven by a driving motor 21 to turn a lever 25 firmly attached to an output shaft 23 to thereby move a transmitting wire 26 connected to the end of the lever 25. A throttle valve 31 is placed in a carburetor 30 and is provided with links 32a and 32b. A wire 34 connects an end of the link 32b to an accelerating pedal 33. A reference numeral 35 designates the engine of a car, a numeral 36 designates a speed meter which detects a car speed by a car sensor to display the speed, a numeral 37 designates a control unit which compares an actual car speed detected by the car sensor with a car speed previously set and supplies to the motor-driven type actuator 20 a control signal on the basis of the comparison, and a numeral 38 designates a switch panel provided with a group of switches for setting or lowering the car speed.

FIG. 10 shows the construction of the actuator 20 in detail. In FIG. 10, a reference numeral 22 designates external lead wires drawn from a housing 20a. The driving motor 21 is mounted on the housing 20a to turn the output shaft 23 extending from the housing 20a in the range of an angle of swing $\theta$. Namely, the actuator 20 drives the transmitting wire 26 within the angle of swing $\theta$ to open and close the throttle valve 31 under controlled condition, wherein the moving speed (gain) of the transmitting wire 26 is constant in the entire region of the angle of swing $\theta$. Thus, in the conventional constant-speed cruising apparatus, the characteristic of a predetermined car speed to a opening/closing speed of the throttle valve (hereinbelow referred to as a gain characteristic) is substantially flat.

However, there have been various demands in the gain characteristics depending on the kind of car. For instance, a high responsiveness is required for the constant-speed cruising apparatus to be mounted on a sports car, since there is some allowability in driving function and accelerating speed on the sports can in comparison with commercial cars or passengers cars. Accordingly, the gain characteristic having linearity with respect to the predetermined car speed is required.

For the commercial cars which are generally used for carrying a relatively large load, it is unnecessary to have a high responsiveness as required in the sports cars, and the gain characteristic of a flat shape in the entire region of the predetermined car speed is required.

For the passenger cars, there is such a demand that a linear gain characteristic like that of a sports car is required in the middle speed region, and a saturation or descending characteristic is required in a high speed region from the viewpoint of stability in car cruising operations.

Thus, the conventional constant-speed cruising apparatus having the substantially flat, constant gain characteristic could not satisfy such requirements in correspondence to various kinds of cars.

OBJECT OF THE INVENTION

It is an object of the present invention to provide a constant-speed cruising apparatus capable of controlling gain characteristics required for various kinds of cars by controlling the radius in swing movement of a lever attached to a motor-driven actuator which opens and closes a throttle valve in a carburetor.

SUMMARY OF THE INVENTION

The foregoing and other objects of the present invention have been attained by providing a constant-speed cruising apparatus which comprises a motor; a motor-driven actuator having an output shaft for transmitting the driving force at a reduced speed from the motor; a power transmitting means including a wire which transmits a turning movement from the output shaft to the first link one end of which is connected to the throttle valve in a carburetor, the throttle valve being also operated by an acceleration pedal through a second link; a control unit for comparing the car speed detected by a car speed sensor with a constant speed previously set and for driving the motor by generating a control signal on the basis of a deviation detected by the comparison; a switch means for setting or releasing the constant speed; and a variable-length lever mechanism in which four arms are movably connected through four elbows to constitute the mechanism in a changeable rhombic shape. A linear actuator is interposed between a first pair of elbows at first opposite corners among the four elbows to expand or contract the distance between the first pair of elbows, and one of a second pair of elbows at second opposite corners is connected to the output shaft and the other is connected to the wire so that a radius in swing movement of the variable rhombic shaped lever mechanism is changed by the operation of the linear actuator based on a signal from the control unit.

DETAILED DESCRIPTION OF THE PRESENTLY PREFERRED EMBODIMENTS

In the following, preferred embodiments of the constant-speed cruising apparatus according to the present invention will be described.

The First Embodiment

Figure 1:
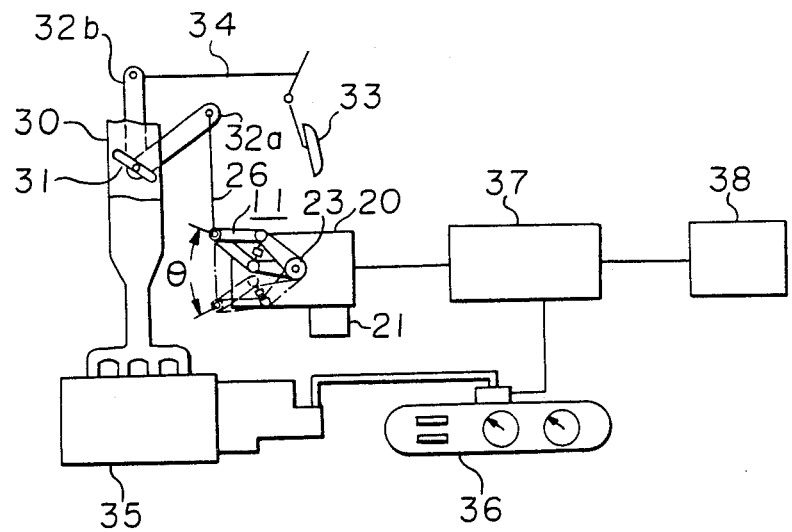
FIG. 1 is a diagram showing an embodiment of the constant-speed cruising apparatus according to the present invention.
Figure 2:
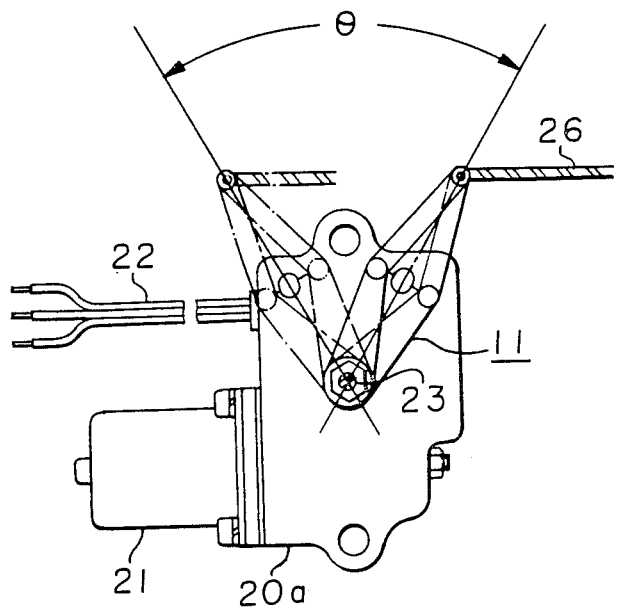
FIG. 2 is an enlarged front view showing a variable-length lever mechanism used for the constant-speed cruising apparatus in FIG. 1.
Figure 9:
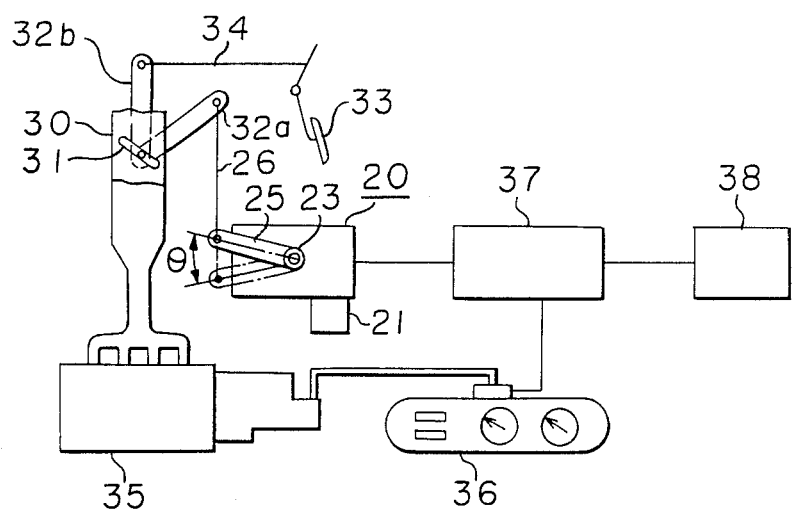
FIG. 9 is a diagram showing a conventional constant-speed cruising apparatus.
Figure 10:
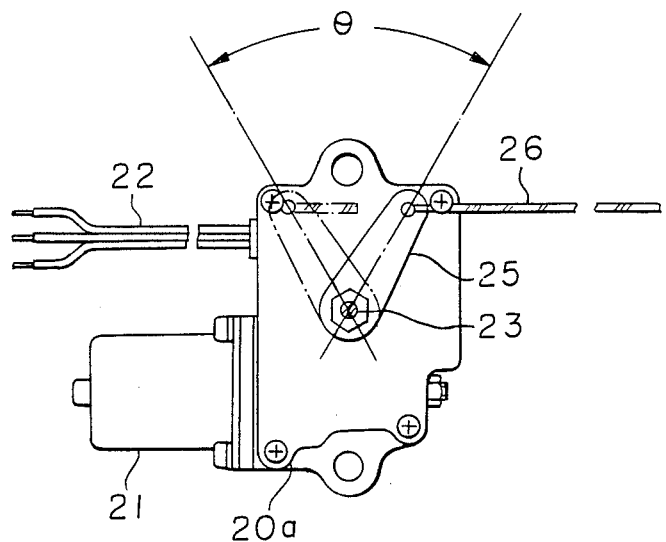
FIG. 10 is an enlarged front view of the actuator in FIG. 9.

In FIG. 1 showing a first embodiment of the present invention, the same reference numerals as in FIGS. 9 and 10 designate the same or corresponding parts and, therefore, description of these parts is omitted.

A variable-length lever mechanism 11 is firmly attached to the output shaft 23 of the motor-driven actuator 20, which includes a reduction gear means (not shown) connected to the driving motor 21, and is swingable at an angle of swing $\theta$.

The detail of the variable-length lever mechanism 11 will be explained with reference to FIG. 3. Two pairs of arms 2, 3 are movably connected at their both ends through four elbows 4, 5, 6 to constitute a rhombic-shaped variable-length lever 7. A linear actuator 8 such as a pneumatic cylinder or a linear motor is interposed between the first pair of elbows 6, 6 on a diagonal line (X—X axis in FIG. 3), and one end of two operating rods 9, 9 is connected to each end of the linear actuator 8 and the other end of each operating rod 9, 9 is connected to corresponding one of the elbows 6, 6. The elbow 4 on the second diagonal line (Y—Y axis) which intersects with the first diagonal line (X—X axis) in the rhombic-shaped variable-length lever 7 is firmly connected to the output shaft 23, and the elbow 5 opposing the elbow 4 on the second diagonal line is connected to the transmitting wire 26.

Figure 3:
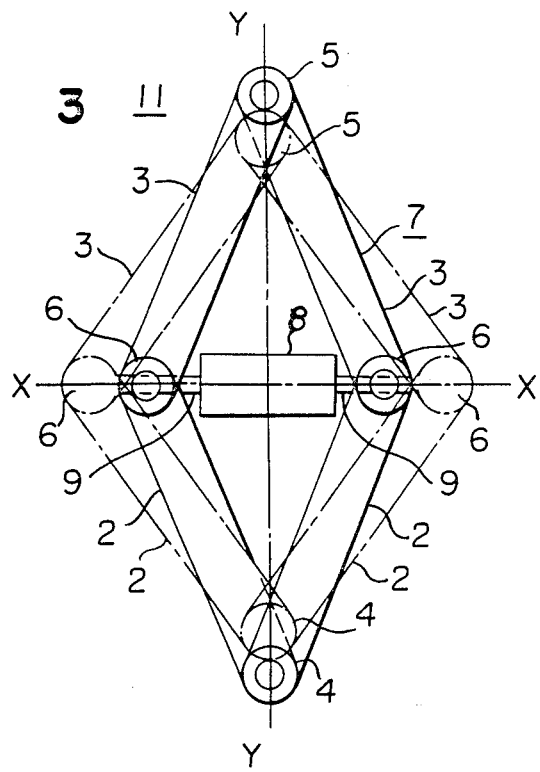
FIG. 3 is a diagram showing the movement of the variable-length lever mechanism according to the first embodiment of the present invention.

In FIG. 3, solid lines indicate the rhombic-shaped variable-length lever 7 in a state of the minimum stroke of the linear actuator 8, and chain lines indicate the linear acuator 8 in a state of the maximum stroke. The distance between the elbows 4, 5 (i.e., the radius in swing movement of the lever mechanism 11) is changed by controlling a pressurized air supplied to the linear actuator 8.

Thus, by actuating the variable-length lever mechanism 11, the transmitting wire 26 is moved to thereby open and close the throttle valve 31, in which the radius in swing of the rhombic-shaped lever 7 is adjusted by controlling the linear actuator 8. As a result, the moving speed of the transmitting wire 26 is controlled by the stroke of the linear actuator 8 to give a variable gain characteristics; thus the stroke adjustment of the wire 26 is carried out.

Figure 8:
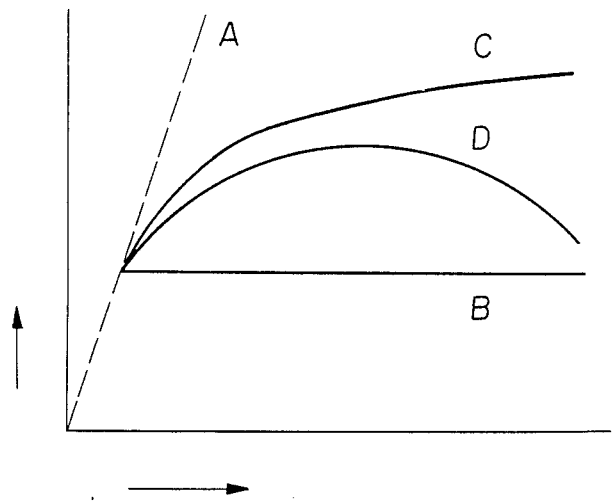
FIG. 8 shows characteristic curves for variable gain control.

FIG. 8 is a characteristic curve showing an example of variable gain control by the variable-length lever mechanism 11. In FIG. 8, the following gain control can be obtained.

Curve A: linear gain characteristic

Proportioning control of the linear actuator 8 in correspondence to a car speed, which is obtained by increasing linearly a voltage to be applied to the driving motor 21 with respect to a predetermined car speed or the stroke (the driving motor 21 is a d.c. motor having a permanent magnet to provide a magnetic field.)

Curve B: flat gain characteristic

A constant stroke control or non-control of the linear actuator 8 (the gain characteristic obtained by the conventional apparatus.)

Curve C: gradually increasing gain characteristic

A non-linear control of the linear actuator 8 to a car speed in the middle region between the curves A and B.

Curve D: gradually increasing/decreasing gain characteristic.

A non-linear control of the linear actuator 8 to the car speed in a high speed region between the curves A and B.

In the first embodiment, the elbow 4 is connected to the output shaft 23, and the transmitting wire 26 is connected to the elbow 5. However, it is feasible that one of the elbows 6, 6 on the first diagonal line is connected to the output shaft 23 and the other elbow 6 is connected to the transmitting wire 26.

THE SECOND EMBODIMENT

Figure 4:
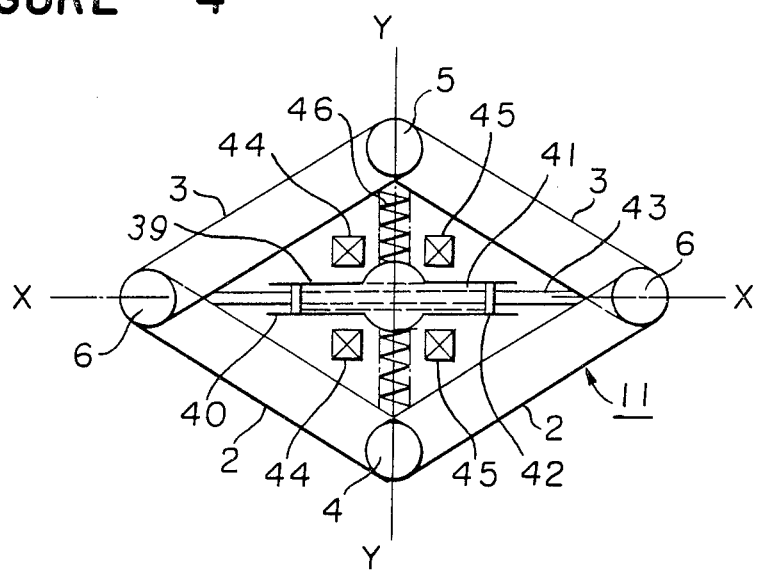
FIG. 4 is a diagram of a second embodiment of the variable-length lever mechanism of the present invention.
Figure 5:
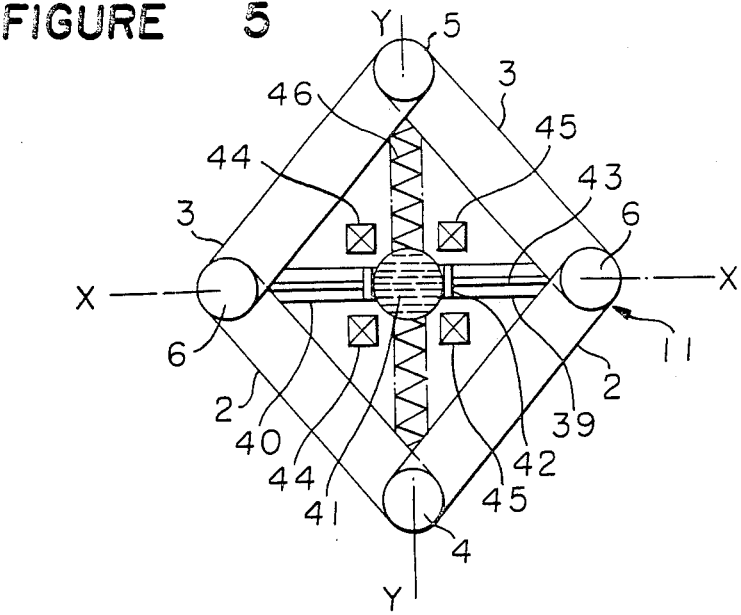
FIG. 5 is a diagram showing the movement of the second embodiment of the present invention.

FIGS. 4 and 5 show a second embodiment of the variable-length lever mechanism 11 according to the present invention. In the second embodiment, two pairs of the arms 2, 3 are movably connected at their ends through the four elbows 4, 5 and 6 to form a freely changeable rhombic-shaped lever. A magnetic fluid type actuator 39 is connected to the elbows 6, 6 placed on the first diagonal line (X—X axis). The magnetic fluid actuator 39 comprises a cylinder 40, a magnetic fluid 41 filled in the cylinder 40, two pistons 42 fitted into both ends of the cylinder 40, two rods 43 one end of which extends from the pistons 42 and the other end of which is connected to a corresponding one of the elbows 6, 6 a pair of electromagnetic coils 44, 45 placed around the cylinder 40 to form a magnetic field, and spring 46 interposed between the elbows 4, 5 along the second diagonal line. In the variable-length lever mechanism 11 constructed as above-mentioned, elbow 4 is connected to the output shaft 23 of the actuator 20, and the elbow 5 is connected to the wire 26.

The operation of the variable-length lever mechanism 11 of the second embodiment will be described.

When the electromagnetic coils 44, 45 are in a non-excited state, the magnetic fluid 41 assumes a substantially spherical form due to the surface tension of the magnetic fluid. In this case, the variable-length lever mechanism 11 takes a posture extending in the Y—Y axis direction as shown in FIG. 5. When the electromagnetic coils 44, 45 are excited, the magnetic fluid 41 is pulled in an elongated form in the Y—Y axis direction as shown in FIG. 4, with the consequence that the pistons 42 are extended outwardly along with the rods 43. As a result, the variable-length lever mechanism 11 is extended in the X—X direction, while it is contracted in the Y—Y axis direction. The quantity of displacement of the lever mechanism 11 in the X—X axis direction is in proportion to the magnetic field caused by the excitation of the electromagnetic coils 44, 45 until the magnetic fluid 41 becomes saturated in magnetism. Accordingly, variable gain control is possible by controlling an electric current to the electromagnetic coils 44, 45 depending on car speed.

The Third Embodiment

Figure 6:
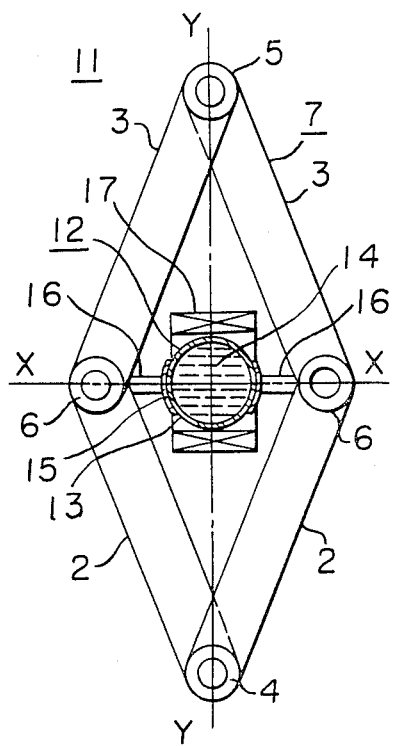
FIGS. 6 and 7 show a third embodiment of the variable-length lever mechanism according to the present invention.
Figure 7:
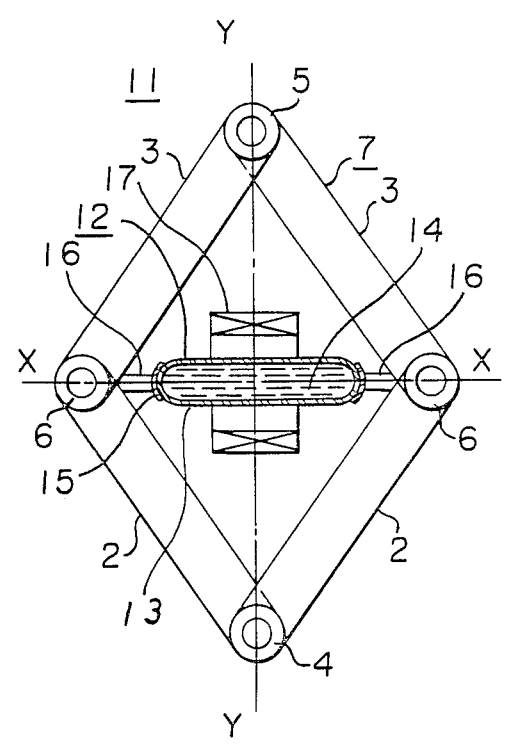

FIGS. 6 and 7 show a third embodiment of the constant-speed cruising apparatus according to the present invention wherein the same reference numerals designate the same or corresponding parts. A magnetic fluid type actuator 12 is interposed between the elbows 6, 6 placed on the first diagonal line (X—X axis). The actuator 12 comprises a freely deformable elastic container 13 made of an elastic film in which a magnetic fluid 14 is filled. At rest, the magnetic fluid 14 assumes a substantially spherical state due to the surface tension of the magnetic fluid. A pair of connecters 15 made of an elastic material are attached to both ends of the elastic container 13 at positions on the first diagonal line (X—X axis). One end of each rod 16 is connected to a corresponding one of the connecters 15, and the other end of each connecting rod 16 is connected to a corresponding one of the elbows 6. An electromagnetic coil 17 in a ring from is placed on the second diagonal line (Y—Y axis) to surround the freely deformable elastic container 13. The rhombic-shaped variable-length lever 7 formed by two pairs of the arms 2, 3 and the elbows 4, 5, 6 is connected to the output shaft 23 by means of the elbow 4, while the transmitting wire 26 is connected to the elbow 5 on the second diagonal line pasing through the elbow 4.

On actuation of the electromagnetic coil 17, a magnetic flux is produced, whereby the magnetic fluid 14 is deformed in a cylindrical form as shown in FIG. 7. Accordingly, the freely deformable elastic container 13 is also deformed in compliance with the magnetic fluid 14, whereby the distance between the elbows 6, 6 of the rhombic-shaped variable-length lever 7 is expanded through the connecting rods 16 while the distance between the elbows 4, 5 is contracted.

By controlling an exciting current to the electromagnetic coil 17, the magnitude of the deformation from the spherical form to the cylindrical form of the elastic container 13 is adjusted, whereby the length of the rhombic-shaped lever 7 in the Y—Y axis direction is controlled to thereby control the stroke of the transmitting wire 26. The radius in swing movement of the variable-length lever 7 (the distance between the elbows 4, 5) is shortened by the magnetic flux produced in the electromagnetic coil 17 so that the length of the rhombic-shaped variable-length lever 7 is in proportion to the magnetic flux until the magnetic fluid 14 reaches saturation of magnetism. Accordingly, the variable gain control can be attained by controlling the current to the coil in correspondence to car speed. The rhombic-shaped lever 7 is restored into a state shown in FIG. 6 by breaking the exciting current to the electromagnetic coil.

The variable gain control as shown in FIG. 8 can also be obtained by the above-mentioned second and third embodiments.

As described above, in accordance with the present invention, the variable-length lever mechanism is attached to the output shaft 23 of the motor-driven type actuator 20 in which the radius (the length) in swing movement of the changeable rhombic-shaped lever 7 of the lever mechanism 11 is controlled by the linear actuator 8 so that a control signal is generated on the basis of comparison of an actual car speed with a predetermined car speed by using the control unit 37. Accordingly, cruising of a car at a constant speed can be obtained based on the gain control in compliance with a kind of car.

We claim :
1. A constant-speed cruising apparatus which comprises:
   (a) a motor;
   (b) a motor-driven actuator having an output shaft for transmitting the driving force at a reduced speed from said motor;
   (c) a power transmitting means including a wire which transmits a turning movement from said output shaft to a first link one end of which is connected to a throttle valve in a carburetor, said throttle valve being also operated by an acceleration pedal through a second link;
   (d) a control unit for comparing the car speed detected by a car speed sensor with a constant speed previously set and for driving said motor by generating a control signal on the basis of a deviation detected by the comparison;
   (e) a switch means for setting or releasing the constant speed; and
   (f) a variable-length lever mechanism having a radius in swing movement, said variable-length lever mechanism comprising:
      (i) two pairs of arms which are movably connected through four elbows to comprise a changeable rhombic shape;
      (ii) a linear actuator which is interposed between a first pair of said four elbows at first opposite corners among said four elbows to expand or contract the distance between said first pair of elbows, and
      (iii) one of a second pair of said four elbows at second opposite corners connected to said output shaft and the other one of said second pair of elbows connected to said wire so that the radius in swing movement of said variable rhombic shaped lever mechanism is changed by the operation of said linear actuator based on a signal from said control unit.
2. The constant-speed cruising apparatus according to claim 1, wherein said linear actuator is a pneumatic cylinder.
3. The constant-speed cruising apparatus according to claim 1, wherein said linear actuator is a linear motor.
4. The constant-speed cruising apparatus according to claim 1, wherein said linear actuator comprises:
   (a) a cylinder-piston mechanism and
   (b) an electromagnetic coil placed around a cylinder containing a magnetic fluid.
5. The constant-speed cruising apparatus according to claim 1, wherein said linear actuator comprises:
   (a) a freely deformable container made of an elastic film which contains a magnetic fluid;
   (b) a pair of rods one end of each of which is connected to said container and the other end of each of which is connected to said first pair of elbows; and
   (c) an electromagnetic coil placed around said container.

* * * * *